(12) United States Patent
Song

(10) Patent No.: US 10,356,310 B2
(45) Date of Patent: Jul. 16, 2019

(54) METHOD FOR DETECTING EYE OF SUBJECT AND ELECTRONIC DEVICE THEREOF

(71) Applicant: Samsung Electronics Co., Ltd, Gyeonggi-do (KR)

(72) Inventor: Wonseok Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 133 days.

(21) Appl. No.: 15/331,780

(22) Filed: Oct. 21, 2016

(65) Prior Publication Data

US 2017/0118405 A1 Apr. 27, 2017

(30) Foreign Application Priority Data

Oct. 21, 2015 (KR) .......................... 10-2015-0146714

(51) Int. Cl.
*H04N 5/232* (2006.01)
*H04N 5/235* (2006.01)

(52) U.S. Cl.
CPC ......... *H04N 5/23219* (2013.01); *H04N 5/235* (2013.01); *H04N 5/2353* (2013.01); *H04N 5/23212* (2013.01); *H04N 5/23293* (2013.01)

(58) Field of Classification Search
CPC ........... H04N 5/23219; H04N 5/23212; H04N 5/23293; H04N 5/2353; G06K 9/00221–00315; G06K 9/00597; G06T 7/75; G06T 7/70; G06T 7/73; G06T 7/74; G06T 7/77
See application file for complete search history.

(56) References Cited

U.S. PATENT DOCUMENTS

| 8,195,042 B2 | 6/2012 | Kimoto | |
|---|---|---|---|
| 2007/0195996 A1* | 8/2007 | Kitamura | G06K 9/00248 382/103 |
| 2011/0205387 A1* | 8/2011 | Tzur | G06K 9/3208 348/222.1 |

FOREIGN PATENT DOCUMENTS

| JP | 2001-215403 | 8/2001 |
|---|---|---|
| JP | 2013-195577 | 9/2013 |
| JP | 2014-056169 | 3/2014 |

* cited by examiner

*Primary Examiner* — Paul M Berardesca

(57) ABSTRACT

Various embodiments of the present disclosure relate to an apparatus and method for detecting an eye of a subject using an electronic device. In an embodiment of the disclosure, a method of operating the electronic device may include acquiring a preview image via a camera module operatively coupled to the electronic device, detecting face rotation information of a subject from the preview image, extracting modeling data corresponding to the face rotation information of the subject, detecting an eye area of the subject based on of the modeling data, and estimating location information of an eye of the subject through the eye area information of the subject. Other embodiments include detecting a face rotation direction of the subject contained in the preview image using a Multi View Face Detection (MVFD) function.

18 Claims, 16 Drawing Sheets

METHOD FOR DETECTING EYE OF SUBJECT AND ELECTRONIC DEVICE THEREOF

CROSS-REFERENCE TO RELATED APPLICATION(S) AND CLAIM OF PRIORITY

The present application is related to and claims the benefit under 35 U.S.C. § 119(a) of a Korean patent application filed in the Korean Intellectual Property Office on Oct. 21, 2015 and assigned Serial No. 10-2015-0146714, the entire disclosure of which is hereby incorporated by reference.

TECHNICAL FIELD

Various embodiments of the present disclosure relate to an apparatus and method for detecting an eye of a subject using an electronic device.

BACKGROUND

With the advance of information communication techniques and semiconductor techniques, various electronic devices are being developed into multimedia devices for providing various multimedia services. For example, a portable electronic device may provide various multimedia services such as a broadcasting service, a wireless Internet service, a capturing service, and a music playback service.

The electronic device may provide various functions for satisfying a demand of a user who wants to easily capture a photo or a moving image through the capturing service. For example, the electronic device may provide an auto capturing function for automatically setting a focus point (a focus) and exposure for a subject so that the user can capture the subject without a special manipulation.

SUMMARY

When an electronic device provides an auto capturing function, the electronic device may set a focus point and an exposure based on a face area of a subject. Further, an electronic device having a low depth of field may set the focus point to an eye of the subject in order to acquire a photo balanced with respect to an overall ratio of a face of the subject. However, if the electronic device cannot detect the eye of the subject or incorrectly detects the eye of the subject, there may be a problem in that reliability for the focus point of the auto capturing function is decreased and thus an incorrect photo is captured.

To address the above-discussed deficiencies, it is a primary object of the instant disclosure to provide an apparatus and method for detecting an eye in an electronic device capable of providing a capturing service.

According to various exemplary embodiments of the present disclosure, an electronic device may include a camera module, and a processor. The processor may detect face rotation information of a subject from a preview image acquired via the camera module, extract modeling data corresponding to the face rotation information of the subject, detect an eye area of the subject based on the modeling data, and estimate location information of an eye of the subject through the eye area of the subject.

According to various exemplary embodiments of the present disclosure, a method of operating an electronic device may include acquiring a preview image via a camera module operatively coupled to the electronic device, detecting face rotation information of a subject from the preview image, extracting modeling data corresponding to the face rotation information of the subject, detecting an eye area of the subject based on the modeling data, and estimating location information of an eye of the subject through the eye area of the subject.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
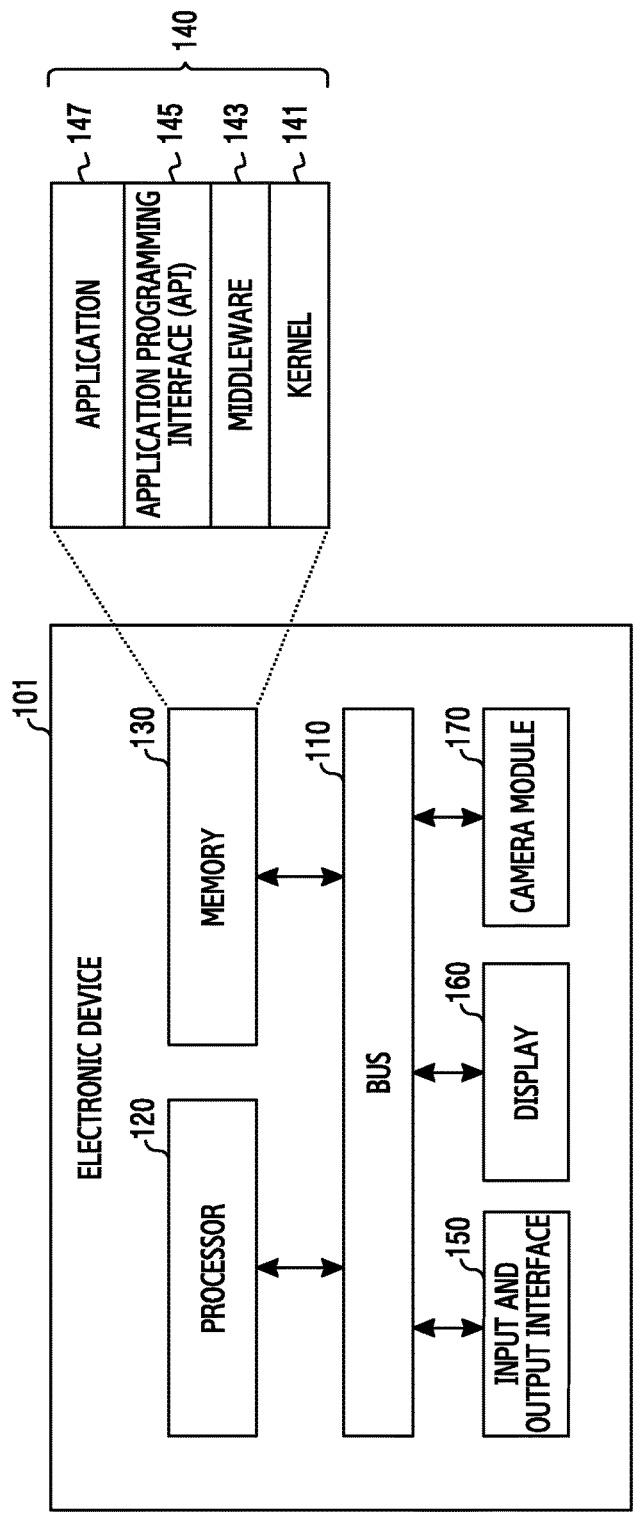
FIG. 1 is a block diagram that illustrates an electronic device according to various embodiments of the present disclosure.

FIGS. 1 through 12C, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, a digital single lens reflex (DSLR), a camcorder, an electronic photo frame, and a wearable device (e.g., smart glasses, a head-mounted-device (HIVID), electronic clothes, an electronic bracelet, an electronic necklace, an electronic appcessory, an electronic tattoo, a smart mirror, or a smart watch).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 illustrates an electronic device according to various embodiments of the present disclosure.

Referring to FIG. 1, an electronic device 101 capable of providing a capturing function may include a bus 110, a processor 120 (e.g., including processing circuitry), a memory 130, an input/output interface 150 (e.g., including input/output circuitry), a display 160 (e.g., including display circuitry), and a camera module 170 (e.g., including camera circuitry). In a certain exemplary embodiment, the electronic device 101 may omit at least one of constitutional elements or may additionally include other constitutional elements.

The bus 110 may include a circuit for connecting, for example, the constitutional elements 120 to 170 and for delivering communication (e.g., a control message/and or data) between the constitutional elements.

The processor 120 may include one or more of a Central Processing Unit (CPU), an Application Processor (AP), and an Image Signal Processor (ISP). The processor 120 may execute an arithmetic operation of data processing for control and/or communication of, for example, at least one different constitutional element of the electronic device 101.

According to an embodiment of the disclosure, the processor 120 may process image data acquired through the camera module 170. For example, the processor 120 may perform an image signal process function for converting an optical signal acquired through the camera module 170 into an electrical signal. For example, the processor 120 may perform a Digital Signal Process (DSP) function for image processing of corresponding image data so that the image data generated by the image signal process function is displayed to the display 160. For example, the image processing may include scaling, noise removal, Red, Green, Blue (RGB) signal conversion, or the like of the image data.

According to an embodiment of the disclosure, the processor 120 may detect an eye area of a subject included in a preview image acquired through the camera module 170. For example, the processor 120 may detect a rotation direction of a face of the subject through a Multi View Face Detection (MVFD) function. For example, the processor 120 may detect a rotation angle of roll, yaw, and pitch directions for the face of the subject included in the preview image. For example, the processor 120 may detect the eye area of the subject based on modeling data corresponding to the rotation direction fir the face of the subject and geometric ratio information of the face. For example, the processor 120 may detect subject's eye area information which is pre-set in the modeling data corresponding to the rotation direction of the face of the subject.

According to an embodiment of the disclosure, the processor 120 may detect an eye of the subject based on the eye area of the subject included in the preview image. For example, the processor 120 may detect the eye of the subject by performing an eye detection function on the eye area of the subject from the preview image. For example, the processor 120 may estimate a current location of the eye of the subject from the eye area by extracting a feature point of an object included in the eye area. For example, if the eye of the subject cannot be detected from the eye area, the processor 120 may determine the eye area as the eye of the subject.

According to an embodiment of the disclosure, the processor 120 may update the modeling data based on eye detection information of the subject. For example, if the eye of the subject is detected from the eye area of the subject, the processor 120 may update the eye area information included in the modeling data or the geometric ratio information of the face so as to be matched to an eye coordinate of the subject.

The memory 103 may include a volatile and/or non-volatile memory. The memory 130 may store a command or data (e.g., a reference distance) related to, for example, at least one different constitutional element of the electronic device 101.

According to an embodiment of the disclosure, the memory 130 may store event generation condition information. For example, the memory 130 may store a reference touch attribute value for generating an event.

According to an embodiment of the disclosure, the memory 103 may store software and/or a program 140. For example, the program may include a kernel 141, a middleware 143, an Application Programming Interface (API) 145, an application program (or an "application") 147, or the like. At least one part of the kernel 141, the middleware 143, and the API 145 may be referred to as an Operating System (OS).

The input/output interface 150 may play a role of an interface capable of delivering to a different constitutional element(s) of the electronic device 101 an instruction or data which is input, for example, from a user or a different external device. Further, the input/output interface 150 may output to the user or the different external device the instruction or data received from the different constitutional element(s) of the electronic device 101. According to an embodiment of the disclosure, the input/output interface 150 may include a touch panel for detecting a touch input or hovering input by using an electronic pen or a part of a user's body. For example, the touch panel may detect the touch input or the hovering input based on a capacitance change caused by the electronic pen or the part of the user's body in a capacitive manner. According to an embodiment of the disclosure, the input/output interface 150 may receive a gesture or a proximity input by using the electronic pen or the part of the user's body.

The display 160 may display, for example, a variety of content (e.g., a text, an image, a video, an icon, a symbol, or the like) for the user. The display 160 may include, for example, a Liquid Crystal Display (LCD), a Light Emitting Diode (LED) display, an Organic Light-Emitting Diode (OLED) display, a Micro Electro Mechanical System (MEMS) display, or an electronic paper display.

The camera module 170 may collect image information for the subject. For example, the camera module 170 may include an image sensor. For instance, the image sensor may use a Charge-Coupled Device (CCD) sensor, a Complementary Metal-Oxide Semiconductor (CMOS) sensor, or the like. For example, the camera module 170 may consist of a plurality of cameras included in the electronic device 101. For instance, the camera module 170 may consist of a first camera (e.g., a front camera) for performing photo capturing in a self mode and a second camera (e.g., a rear camera) for capturing a subject located in front of the user.

The electronic device 101 may further include a communication interface (not shown).

According to an embodiment of the disclosure, the communication interface may configure communication between the electronic device 101 and an external device. For example, the communication interface may be connected to a network through wireless communication or wired communication to communicate with the external device (e.g., an external electronic device or a server). For example, the network may include at least one of a telecommunication network, a computer network (e.g., LAN or WAN), the Internet, and a telephone network. For example, the communication interface may communicate with the external device through near-distance communication.

According to an embodiment of the disclosure, if the electronic device 101 includes the communication interface, the processor 120 may include a Communication Processor (CP).

According to an embodiment of the disclosure, the touch panel of the input/output interface 150 and the display 160 may be configured as one module, which is called a touch screen.

According to an embodiment of the disclosure, the camera module 170 may perform an Image Signal Process (ISP) function for converting an optical signal acquired through an image sensor into an electrical signal and a digital signal process function for executing image processing for image data.

Figure 2:
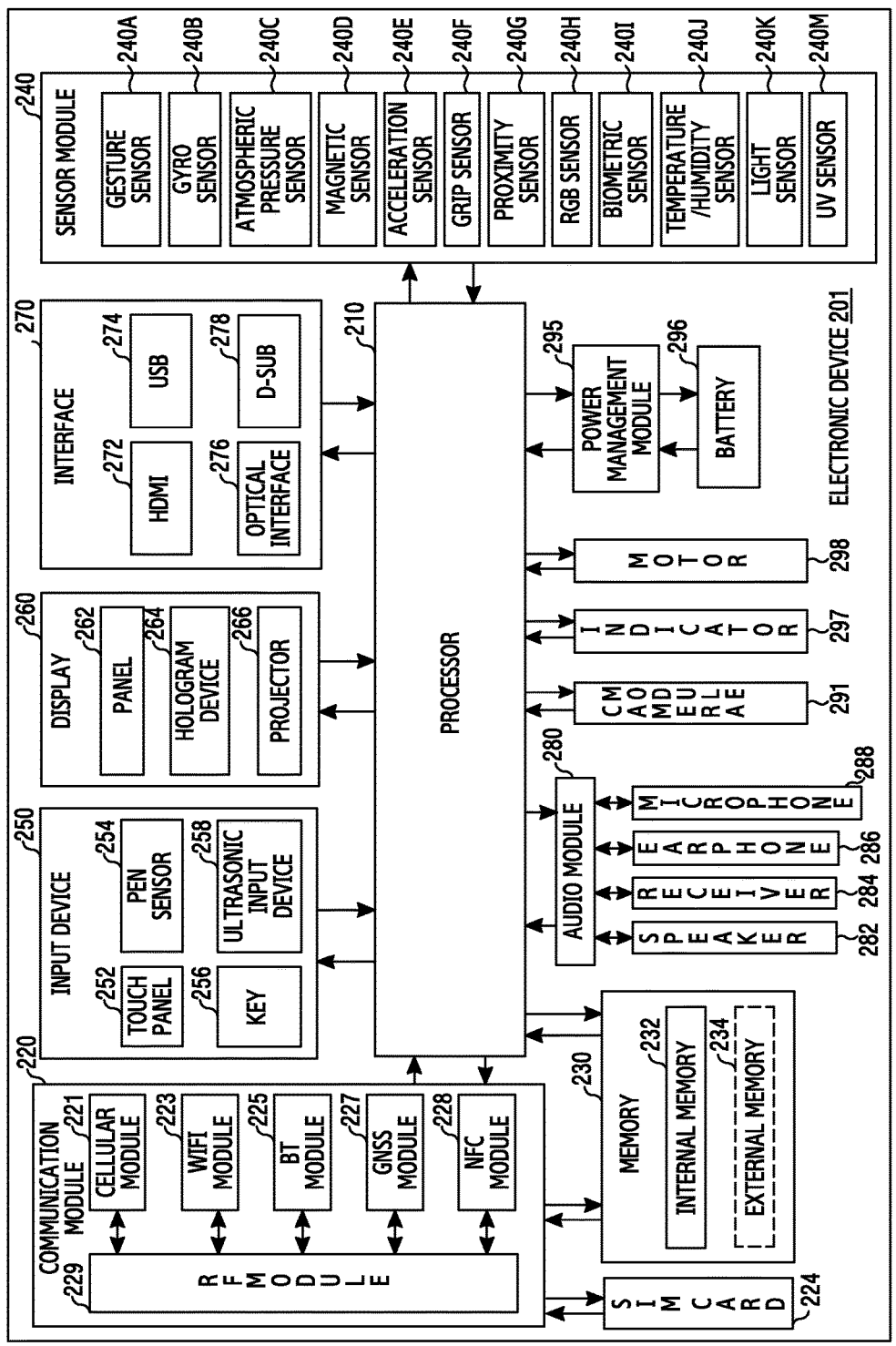
FIG. 2 is a block diagram that illustrates an electronic device according to an embodiment of the present disclosure.

FIG. 2 is a block diagram of an electronic device 201 according to an embodiment of the present disclosure. The electronic device 201 may include, for example, all or some parts of the electronic device 101 of FIG. 1. The electronic device 201 may include one or more processors (e.g., Application Processors (APs)) 210, a communication module 220, a subscriber identity module 224, a memory 230, a sensor module 240, an input unit 250, a display 260, an interface 270, an audio module 280, a camera module 291, a power management module 295, a battery 296, an indicator 297, and a motor 298.

The processor 210 may control a plurality of hardware or software constitutional elements connected to the processor 210 by driving, for example, an operating system or an application program, and may process a variety of data including and may perform an arithmetic operation. The processor 210 may be implemented, for example, with a System on Chip (SoC). According to an embodiment of the disclosure, the processor 210 may further include a Graphic Processing Unit (GPU) and/or an image signal processor. The processor 210 may include at least one part (e.g., the cellular module 221) of the constitutional elements of FIG. 2. The processor 210 may load an instruction or data, received from at least one of different constitutional elements (e.g., a non-volatile memory), into a volatile memory to process the instruction or data, and may store a variety of data into the non-volatile memory.

According to an embodiment of the disclosure, the processor 210 may detect an eye of a subject included in a preview image acquired from the camera module 291.

The communication module 220 may include, for example, the cellular module 221, a Wi-Fi module 223, a BlueTooth® (BT®) module 225, a Global Navigation Satellite System (GNSS®) module (e.g., a Global Positioning System (GPS) module, a Glonass® module, a Beidou® module, or a Galileo® module) 227, a Near Field Communication (NFC) module 228, and a Radio Frequency (RF) module 229.

The cellular module 221 may provide a voice call, a video call, a text service, an Internet service, or the like, for example, through a communication network. According to an embodiment of the disclosure, the cellular module 221 may identify and authenticate the electronic device 201 may in the communication network by using the subscriber identity module (e.g., a SIM card) 224. According to an embodiment of the disclosure, the cellular module 221 may perform at least some functions that can be provided by the processor 210. According to an embodiment of the disclosure, the cellular module 221 may include a Communication Processor (CP).

Each of the WiFi module 223, the BT® module 225, the GNSS® module 227, and the NFC module 228 may include, for example, a processor for processing data transmitted/received through a corresponding module. According to an embodiment of the present disclosure, at least some (e.g., two or more) of the cellular module 221, the WiFi module 223, the BT® module 225, the GNSS® module 227, and the NFC module 228 may be included in one Integrated Chip (IC) or IC package.

The RF module 229 may transmit/receive, for example, a communication signal (e.g., a Radio Frequency (RF) signal). According to an embodiment of the disclosure, at least one of the cellular module 221, the WiFi module 223, the BT® module 225, the GNSS® module 227, and the NFC module 228 may transmit/receive an RF signal via a separate RF module.

The subscriber identity module 224 may include, for example, a card including the subscriber identity module and/or an embedded Subscriber Identity Module (SIM), and may include unique identification information (e.g., an Integrated Circuit Card IDentifier (ICCID)) or subscriber information (e.g., an International Mobile Subscriber Identity (IMSI)).

The memory 230 (e.g., the memory 130) may include, for example, an internal memory 232 or an external memory 234. The external memory 234 may be operatively and/or physically coupled to the electronic device 201 via various interfaces.

The sensor module 240 may measure, for example, physical quantity or detect an operational status of the electronic device 201, and may convert the measured or detected information into an electric signal. The sensor module 240 may include, for example, at least one of a gesture sensor 240A, a gyro sensor 240B, a pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternatively, the sensor module 240 may include, for example, an E-nose sensor, an ElectroMyoGraphy (EMG) sensor, an ElectroEncephaloGram (EEG) sensor, an ElectroCardioGram (ECG) sensor, an Infrared (IR) sensor, an iris sensor, and/or a fingerprint sensor. The sensor module 240 may further include a control circuit for controlling at least one or more sensors included therein. In a certain exemplary embodiment, the electronic device 201 may further include a processor configured to control the sensor module 204 either separately or as a part of the processor 210, and may control the sensor module 240 while the processor 210 is in a sleep state.

The input device 250 may include, for example, a touch panel 252, a (digital) pen sensor 254, a key 256, or an ultrasonic input unit 258. The touch panel 252 may recognize a touch input, for example, by using at least one of an electrostatic type, an infrared type, and an ultrasonic type. The touch panel 252 may further include a control circuit. The touch penal 252 may further include a tactile layer and thus may provide the user with a tactile reaction.

The (digital) pen sensor 254 may be implemented, for example, by using the same or similar method of receiving a touch input of the user or by using an additional sheet for recognition. The key 256 may be, for example, a physical button, an optical key, or a keypad. The ultrasonic input unit 258 may detect an ultrasonic wave generated in an input means through a microphone (e.g., a microphone 288), and may confirm data corresponding to the detected ultrasonic wave.

The display 260 (e.g., the display 160) may include a panel 262, a hologram unit 264, or a projector 266. The panel 262 may include the same or similar structure of the display 160 of FIG. 1. The panel 262 may be implemented, for example, in a flexible, transparent, or wearable manner. The panel 262 may be constructed as one module with the touch panel 252. The hologram unit 264 may use an interference of light and show a stereoscopic image in the air. The projector 266 may display an image by projecting a light beam onto a screen. The screen may be located, for example, inside or outside the electronic device 201. According to an embodiment of the disclosure, the display 260 may further include a control circuit for controlling the panel 262, the hologram unit 264, or the projector 266.

The interface 270 may include, for example, a High-Definition Multimedia Interface (HDMI) 272, a Universal Serial Bus (USB) 274, an optical communication interface 276, or a D-subminiature (D-sub) 278. Additionally or alternatively, the interface 270 may include, for example, a Mobile High-definition Link (MHL) interface, a Secure Digital (SD)/Multi-Media Card (MMC) interface, or an Infrared Data Association (IrDA) standard interface.

The audio module 280 may bilaterally convert, for example, a sound and electric signal. At least one constitutional element of the audio module 280 may be included, for example, in the input/output interface 145 of FIG. 1. The audio module 280 may convert sound information which is input or output, for example, through a speaker 282, a receiver 284, an earphone 286, the microphone 288, or the like.

The camera module 291 may have the same or similar structure as the camera module 170 of FIG. 1. The camera module 291 is, for example, a device for image and video capturing, and according to an embodiment of the disclosure, may include one or more image sensors (e.g., a front sensor or a rear sensor), a lens, an Image Signal Processor (ISP), or a flash (e.g., LED or xenon lamp or the like).

The power management module 295 (e.g., the power management module 180) may manage, for example, power of the electronic device 201. According to an embodiment of the disclosure, the power management module 295 may include a Power Management Integrated Circuit (PMIC), a charger Integrated Circuit (IC), or a battery or fuel gauge.

The battery 296 (e.g., the battery 190) may include, for example, a rechargeable battery and/or a solar battery. According to an embodiment of the disclosure, the battery 296 may include a plurality of cells connectable in serial or parallel.

The indicator 297 may indicate a specific state, for example, a booting state, a message state, a charging state, or the like, of the electronic device 201 or a part thereof (e.g., the processor 210). The motor 298 may convert an electric signal into a mechanical vibration, and may generate a vibration or haptic effect or the like.

Each of constitutional elements described in the present document may consist of one or more components, and names of the constitutional elements may vary depending on a type of an electronic device. In various exemplary embodiments, the electronic device may include at least one of the constitutional elements described in the present document. Some of the constitutional elements may be omitted, or additional other constitutional elements may be further included. In addition, some of the constitutional elements of the electronic device according to the various embodiments may be combined and constructed to one entity, so as to equally perform functions of corresponding constitutional elements before combination.

Figure 3:
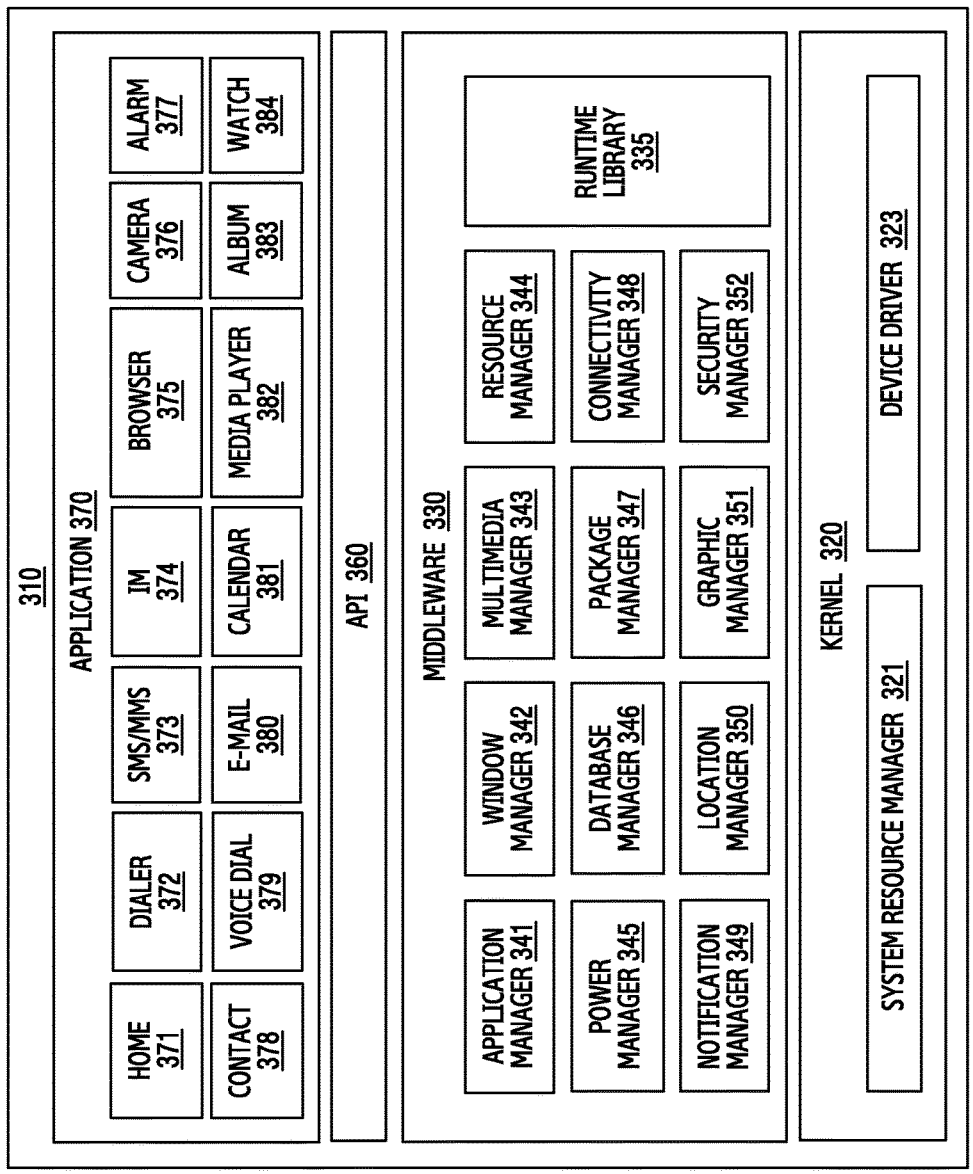
FIG. 3 is a block diagram that illustrates a program module according to various embodiments of the present disclosure.

FIG. 3 is a block diagram of a program module according to various exemplary embodiments. According to an embodiment of the disclosure, a program module 310 (e.g., the program 140) may include an Operating System (OS) for controlling a resource related to an electronic device (e.g., the electronic device 101 or 201) and/or various applications (e.g., the application 147) driven on the OS. The OS may be, for example, Android®, iOS®, Windows®, Symbian®, Tizen®, Bada®, or the like.

The program module 310 may include a kernel 320, a middleware 330, an Application Programming Interface (API) 360, and/or an application 370. At least one part of the program module 310 can be preloaded on the electronic device, or can be downloaded from an external device (e.g., the external electronic device 102 or 104, the server 106, etc.).

The kernel 320 (e.g., the kernel 141) may include, for example, a system resource manager 321 and/or a device driver 323. The system resource manager 321 may perform control, allocation, retrieval, or the like of the system resource.

The middleware 330 may provide, for example, a function commonly required by the application 370, or may provide various functions through the API 360 so that the application 370 can effectively use a limited system resource in the electronic device. According to an embodiment of the disclosure, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a compiler to add a new function through a programming language while the application 370 is executed. The runtime library 335 may perform an operation of an input/output management, a memory management, an arithmetic function, or the like.

The application manager 341 may manage, for example, a life cycle of at least one application among the applications 370. The window manager 342 may manage a Graphic User Interface (GUI) resource used in a screen. The multimedia manager 343 may recognize a format required to reproduce various media files, and may use a codec suitable for the format to perform encoding or decoding of the media file. The resource manager 344 may manage a resource (e.g., a source code, a memory, a storage space, etc.) of at least one application among the applications 370.

The power manager 345 may manage, for example, a battery or power by operating together with a Basic Input/Output System (BIOS), or the like, and may provide power information or the like required for the operation. According to an embodiment of the disclosure, the power manager 345 may provide control such that battery charging and discharging are offered in a wired and/or wireless manner.

The database manager 346 may manage to generate, search, or change a database to be used in at least one application among the applications 370. The package manager 347 may manage an installation or update of an application distributed in a form of a package file.

The connectivity manager 348 may manage, for example, a wireless connection such as WiFi, Bluetooth®, or the like. The notification manager 349 may display or notify an event such as an incoming message, an appointment, a proximity notification, or the like, in a manner of not disturbing the user. The location manager 350 may manage location information of the electronic device. The graphic manager 351 may manage a graphic effect to be provided to the user or a user interface related thereto. The security manager 352 may provide a general security function required for system security, user authentication, or the like.

According to an embodiment of the disclosure, if the electronic device (e.g., the electronic device 101) includes a telephone function, the middleware 330 may further include a telephony manager for managing a voice or video telephony function of the electronic device. In addition, it may further include an IMS manager for providing a multimedia service such as an application, audio, video, data, or the like based on an Internet Protocol (IP).

The middleware 330 may include a middleware module for forming a combination of various functions of the aforementioned constitutional elements. The middleware 330 may provide a module specified for each type of operating system to provide a differentiated function. Further, the middleware 330 may dynamically delete some of the existing constitutional elements or may add new constitutional elements.

The API 360 (e.g., the API 145) is, for example, a set of API programming functions, and may be provided with other configurations according to an operating system. For example, an operating system such as an Android® or iOS®, one API set may be provided for each platform, and for an example such as Tizen®, two or more API sets may be provided.

The application 370 (e.g., the application program 147) may include one or more applications capable of providing a function of, for example, a home 371, a dialer 372, a Short Message Service (SMS)/Multimedia Messaging Service (MMS) 373, an Instant Message (IM) 374, a browser 375, a camera 376, an alarm 377, a contact 378, a voice dial 379, an e-mail 380, a calendar 381, a media player 382, an album 383, a clock 384, or a health care application (e.g., an application for measuring a physical activity level, a blood sugar level, etc.), or an application providing of environment information (e.g., providing of atmospheric pressure, humidity, or temperature information).

According to an embodiment of this disclosure, the application 370 may include a preloaded application or a third party application that can be downloaded from the server. A name of constitutional elements of the program module 310 according to the illustrated exemplary embodiment may differ depending on an OS type.

According to various embodiments of this disclosure, at least a part of the program module 310 may be implemented in software, firmware, hardware, or at least two or more of combinations thereof. At least some parts of the program module 310 may be implemented (e.g., executed), for example, by a processor (e.g., the processor 210). At least some parts of the program module 310 may include, for example, modules, programs, routines, sets of instructions, processes, or the like for performing one or more functions.

Figure 4:
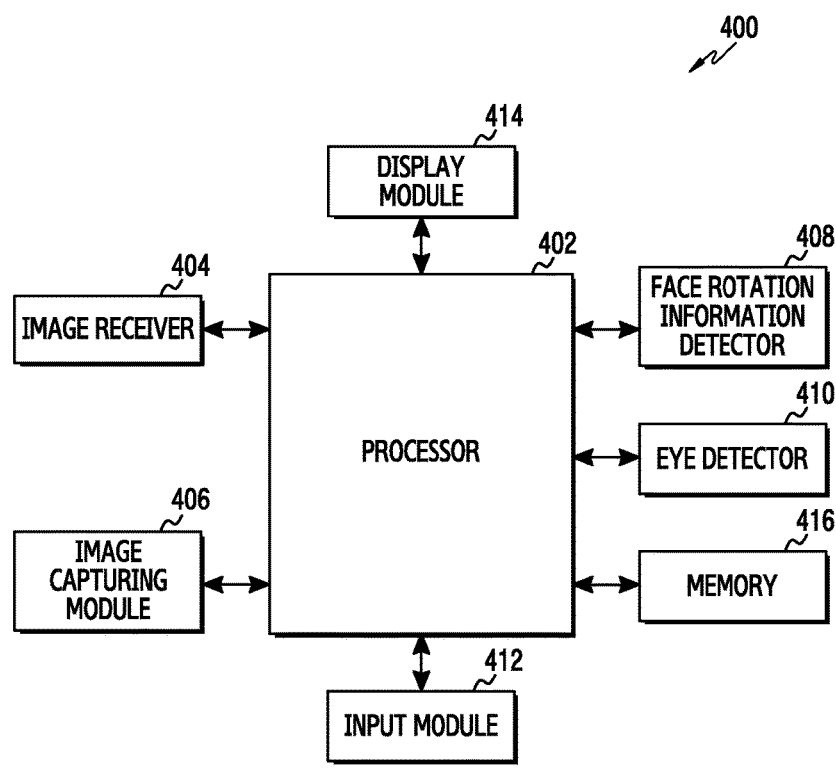
FIG. 4 is a block diagram that illustrates an electronic device for detecting an eye of a subject according to various embodiments of the present disclosure.
Figure 5A:
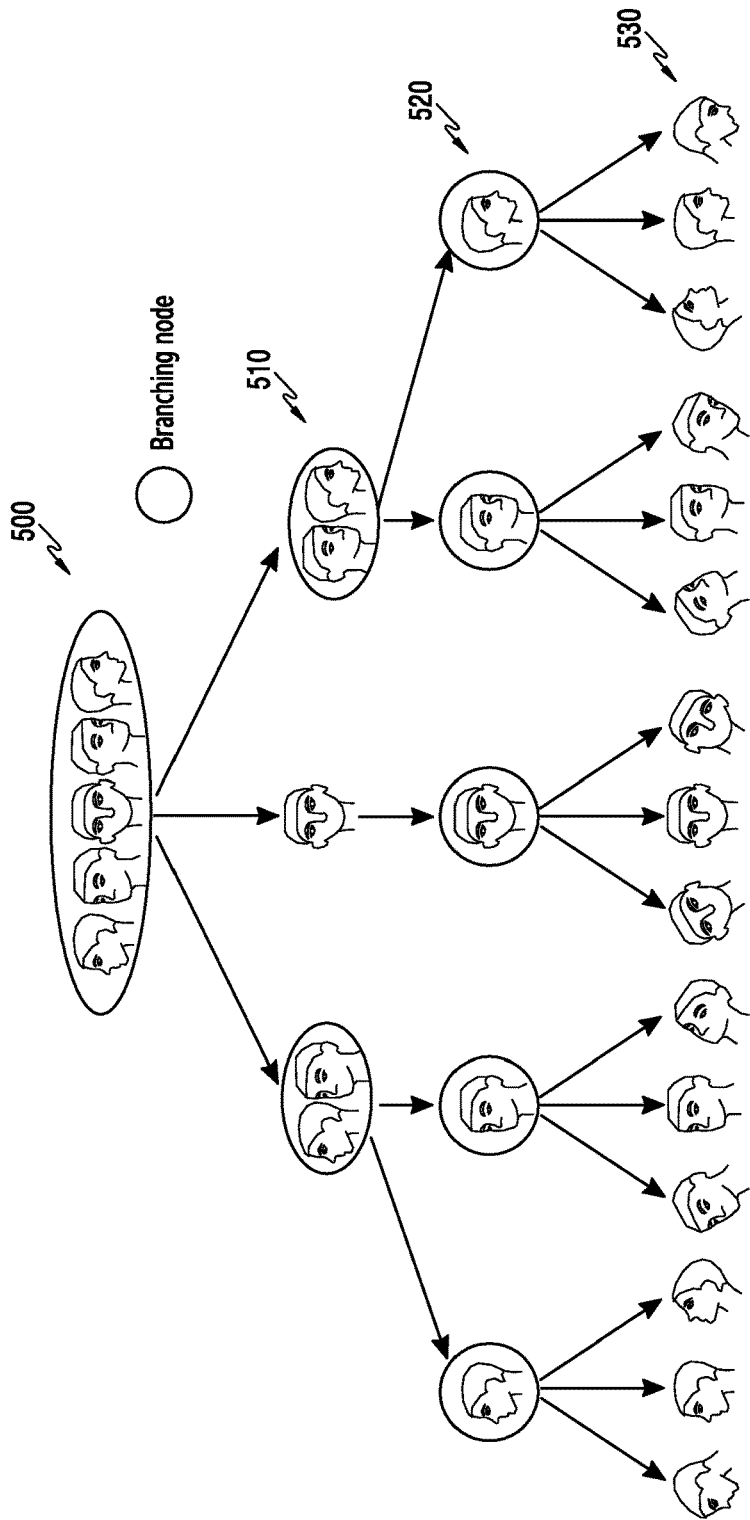
FIG. 5A and FIG. 5B illustrate modeling data corresponding to rotation information of a face according to various embodiments of the present disclosure.
Figure 5B:
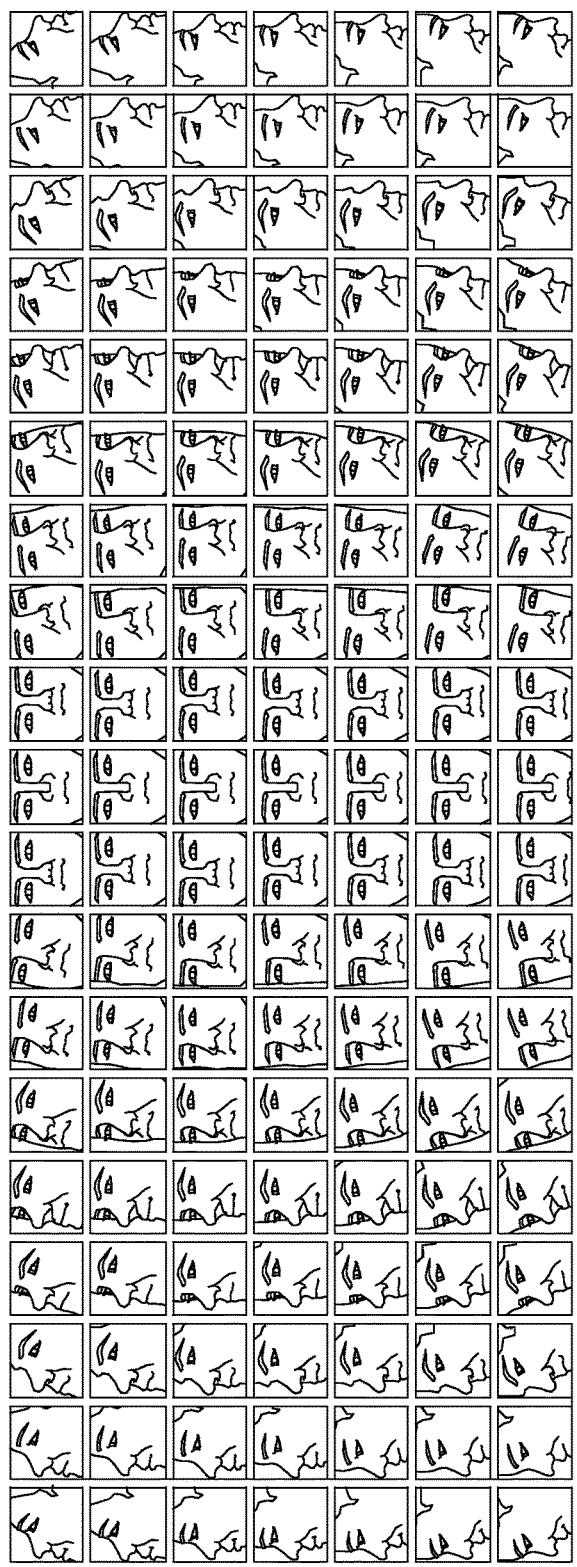

FIG. 4 is a block diagram that illustrates an electronic device for detecting an eye of a subject according to various embodiments of the present disclosure. FIG. 5A and FIG. 5B illustrate modeling data corresponding to rotation information of a face according to various exemplary embodiments of the present disclosure. In the following description, an electronic device 400 may include, for example, all or some parts of the electronic device 101 of FIG. 1.

Referring to FIG. 4, the electronic device 400 may include a processor 402, an image receiver 404, an image capturing module 406, a face rotation information detector 408, an eye detector 410, an input module 412, a display 414, and a memory 416.

According to an embodiment of the disclosure, the processor 402 (e.g., the processor 120 of FIG. 1 or the processor 210 of FIG. 2) may process image data (a preview image) acquired through the image receiver 404. For example, the processor 402 may convert an optical signal acquired through the image receiver 404 into an electrical signal. For example, the processor 402 may perform image processing of image data so that the image data generated by the image signal process function is displayed to the display 414.

According to an embodiment of the disclosure, the image receiver 404 may collect an image for the subject. For example, the image receiver 404 may include an image sensor to acquire a preview image for the subject.

According to an embodiment of the disclosure, the image capturing module 406 may capture the preview image acquired through the image receiver 404. For example, the image capturing module 406 may capture an image according to a focus point (a focus) based on a subject's eye coordinate acquired from the eye detector 410.

According to an embodiment of the disclosure, the face rotation information detector 408 may detect face rotation information of the subject included in the preview image acquired through the image receiver 404. For example, the face rotation information detector 408 may detect a rotation angle of roll, yaw, and pitch rotation directions of a face of the subject through an MVFD function.

According to an embodiment of the disclosure, the eye detector 410 may detect an eye area of the subject based on geometric ratio information of the face and modeling data corresponding to rotation information of the subject's face acquired through the face rotation information detector 408. For example, as shown in FIG. 5A, the electronic device 400 may add up/down rotation direction (or roll rotation direction) information 510 to left/right rotation direction (yaw rotation direction) information 500 of the user's face, may add diagonal rotation direction (pitch rotation direction) information 530 to each piece of the up/down rotation direction information 520. As a result, modeling data regarding a face rotation direction may be generated as shown in FIG. 5B, and the data may be stored in the memory 416. The eye detector 410 may extract at least one piece of modeling data corresponding to subject's face rotation information acquired via the face rotation information detector 408 among a plurality of pieces of modeling data regarding the face rotation direction and stored in the memory 416. For example, the eye detector 410 may extract an eye area corresponding to the geometric ratio information of the face from at least one piece of modeling data corresponding to the subject's face rotation information. For example, the eye detector 410 may extract eye area information which is pre-set in the at least one piece of modeling data corresponding to the subject's face rotation information.

According to an embodiment of the disclosure, the eye detector 410 may detect an eye of the subject on the basis of an eye area of the subject included in a preview area. For example, the eye detector 410 may estimate an accurate location of the subject's eye included in the eye area by extracting a feature point of an object included in the eye area of the subject. For example, if the subject's eye cannot be detected from the eye area, the eye detector 410 may determine the eye area as the eye of the subject.

According to an embodiment of the disclosure, upon detection of an accurate eye of the subject from the eye detector 410, the processor 402 may update geometric ratio information and modeling data corresponding to the subject on the basis of a coordinate of the eye. For example, the processor 402 may update the geometric ratio information used to detect an eye area from at least one piece of modeling data corresponding to subject's face rotation information on the basis of the eye coordinate of the subject. For example, the processor 402 may update a location and size of the eye area, which is pre-set in each piece of modeling data corresponding to a face rotation direction, on the basis of the eye coordinate of the subject.

According to an embodiment of the disclosure, the processor 402 may configure a focus point for auto capturing or may configure the focus point and an exposure on the basis of location information of the subject eye acquired from the eye detector 410. For example, the processor 402 may configure a focus point for Auto Focus (AF) and an exposure for Auto Exposure (AE) on the basis of the location information of the subject eye acquired from the eye detector 410. For example, the processor 402 may configure the focus point for the AF on the basis of the location information of the subject eye acquired from the eye detector 410. The processor 402 may configure the exposure for the AE on the basis of a face area (or a face coordinate) of the subject.

According to an embodiment of the disclosure, the input module 412 may deliver to other constitutional element(s) of the electronic device an instruction or data which is input from the user or other external devices to control an operation of the electronic device. For example, the input module 412 may include a key pad, a dome switch, a physical button, a touch pad (static pressure/electrostatic), jog & shuttle, or the like.

According to an embodiment of the disclosure, the display 414 may display various contents (e.g., a text, an image, a video, an icon, a symbol, or the like) for the user. For example, the display 414 may display the preview image acquired via the image receiver 404.

According to an embodiment of the disclosure, the memory 416 may store an instruction and data related to a constitutional element constituting the electronic device. For example, the memory 416 may store modeling data corresponding to the face rotation direction. In addition, the memory 416 may store eye area information regarding each piece of modeling data. For example, the memory 416 may store geometric ratio information regarding a typical user face.

According to an embodiment of the disclosure, the camera module 170 of FIG. 1 may include the image receiver 404 and image capturing module 406 of FIG. 4.

According to an embodiment of the disclosure, the processor 120 of FIG. 1 may include the processor 402, face rotation information detector 408, and eye detector 410 of FIG. 4.

Figure 6:
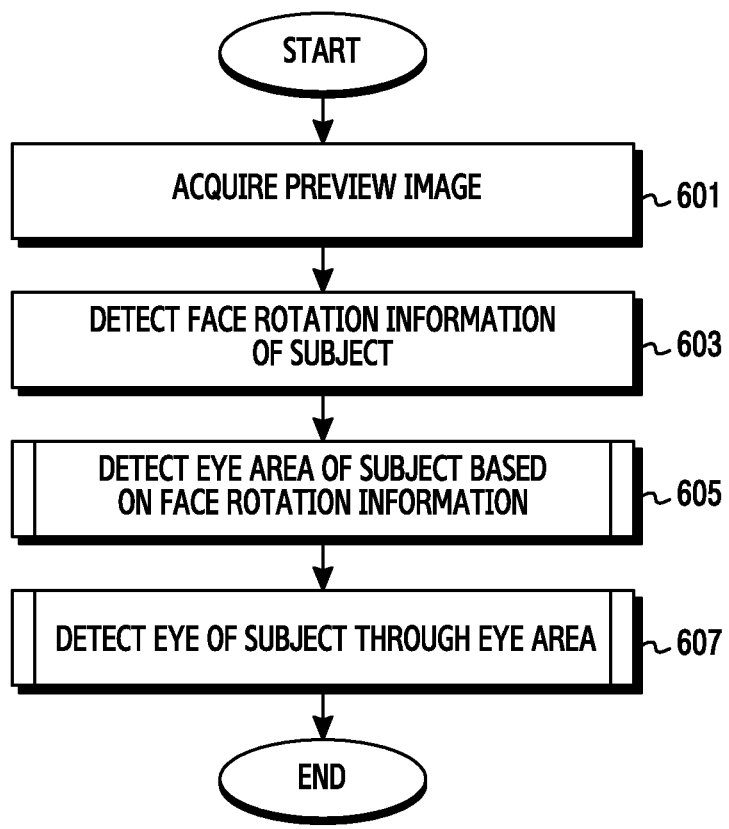
FIG. 6 is a flowchart that illustrates a method for detecting an eye of a subject in an electronic device according to various embodiments of the present disclosure.

FIG. 6 illustrates a flowchart for detecting an eye of a subject in an electronic device according to various embodiments of the present disclosure.

Referring to FIG. 6, in operation 601, the electronic device (e.g., the electronic device 101, 201, or 400) may acquire a preview image via a camera module (e.g., the camera module 170 or the image receiver 404) operatively coupled to the electronic device. For example, upon detection of a camera service event on the basis of input information acquired via the input module 412, the processor 402 may control the display 414 to display the preview image acquired via the image receiver 404.

In operation 603, the electronic device may detect face rotation information of a subject from the preview image. For example, the face rotation information detector 408 may perform an MVFD function for the preview image provided via the processor 402 to detect a face rotation direction of the subject included in the preview image.

In operation 605, the electronic device may detect an eye area of the subject included in the preview image on the basis of the face rotation information of the subject. For example, the eye detector 410 may select modeling data corresponding to the subject's face rotation information detected from the face rotation information detector 408 among a plurality of pieces of modeling data regarding the face rotation direction and stored in the memory 416. For example, the eye detector 410 may extract an eye area corresponding to geometric ratio information of the face from the modeling data corresponding to the subject's face rotation information. For example, the eye detector 410 may detect eye area information which is pre-set in at least one piece of modeling data corresponding to the subject's face rotation information.

In operation 607, the electronic device may detect an eye of the subject on the basis of the eye area information of the subject. For example, the eye detector 410 may extract a feature point for at least one object included in the eye area of the subject to estimate an eye location (coordinate) of the subject included in the eye area. For example, if the eye of the subject cannot be detected from the eye area, in operation 605, the eye detector 410 may determine the eye area in the detected modeling data as the eye of the subject included in the preview image.

Figure 7:
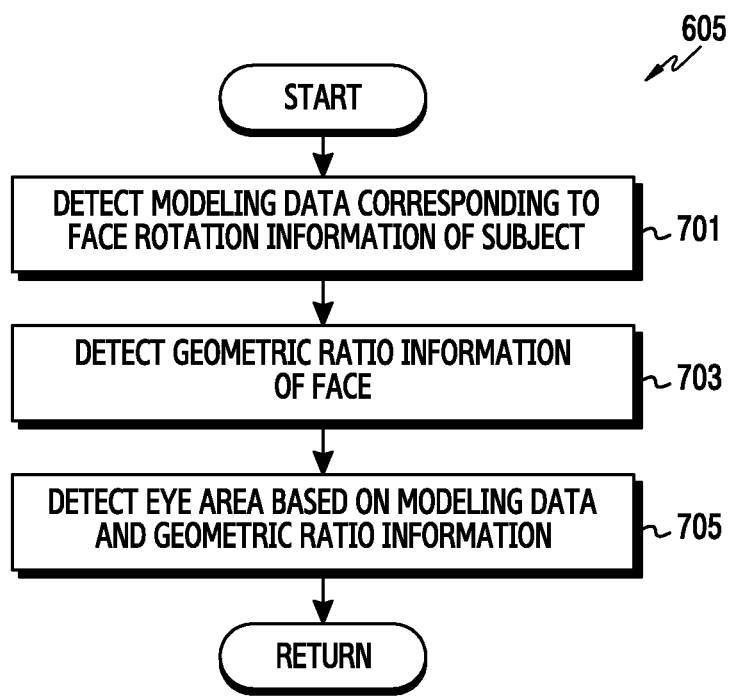
FIG. 7 is a flowchart that illustrates a method for detecting an eye area of a subject in an electronic device according to various embodiments of the present disclosure.
Figure 8A:
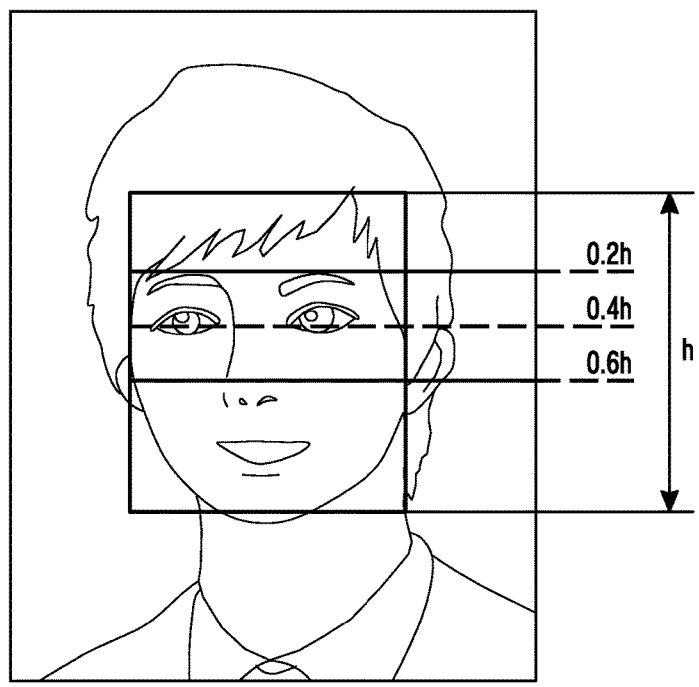
FIG. 8A and FIG. 8B illustrate an eye area of a subject according to various embodiments of the present disclosure.
Figure 8B:
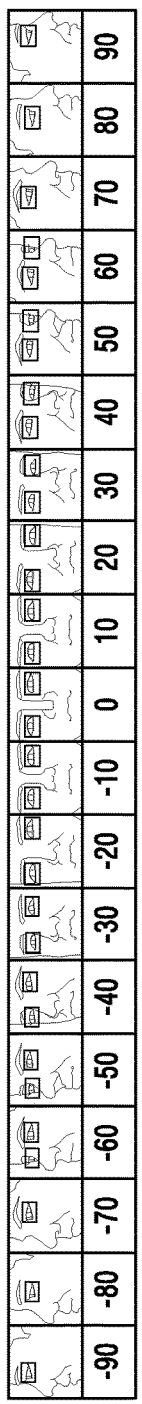

FIG. 7 illustrates a flowchart for detecting an eye area of a subject in an electronic device according to various exemplary embodiments of the present disclosure. FIG. 8A and FIG. 8B illustrate an eye area of a subject according to various exemplary embodiments of the present disclosure. In the following description, an operation of detecting an eye area of a subject in operation 605 of FIG. 6 is described with reference to FIG. 8A and FIG. 8B.

Referring to FIG. 7, in operation 701, the electronic device (e.g., the electronic device 101, 201, or 400) may detect modeling data corresponding to face rotation information of a subject included in a preview image. For example, as shown in FIG. 5B, the eye detector 410 may extract at least one piece of modeling data corresponding to the subject's face rotation information detected from the face rotation information detector 408 among a plurality of pieces of modeling data corresponding to a pre-defined face rotation direction. For instance, the modeling data corresponding to the pre-defined face rotation direction may be stored in the memory 416 of the electronic device 400.

In operation 703, the electronic device may detect face's geometric ratio information. For example, as shown in FIG. 8A, the eye detector 410 may detect the face's geometric ratio information indicating that eyes are located generally in the range of 0.3 h to 0.5 h in a total human face length h. In addition, in order to allow the eye area to include eye brows that can be used as an important factor for setting a focus point, the eye detector 410 may detect the face's geometric ratio information indicating that eyes are located generally in the range of 0.2 h to 0.5 h in the total human face length h.

In operation 705, the electronic device may detect the eye area corresponding to the face's geometric ratio information from the modeling data corresponding to the face rotation information of the subject. For example, as shown in FIG. 8B, the eye detector 410 may extract the eye area corresponding to the face's geometric ratio information from the modeling data corresponding to the face rotation information of the subject.

According to various exemplary embodiments of the present disclosure, the electronic device (e.g., the electronic device 101, 201, or 400) may extract eye area information which is pre-set in at least one piece of modeling information corresponding to the face rotation information of the subject. For example, upon detection of an accurate eye location of the subject included in the preview area, the processor 402 may configure an eye area including an eye location in modeling data corresponding to the face rotation information of the subject. Accordingly, upon extraction of the modeling data in which the eye area is configured on the basis of the face rotation information of the subject, the eye detector 410 may extract eye area information which is pre-set in the modeling data.

Figure 9:
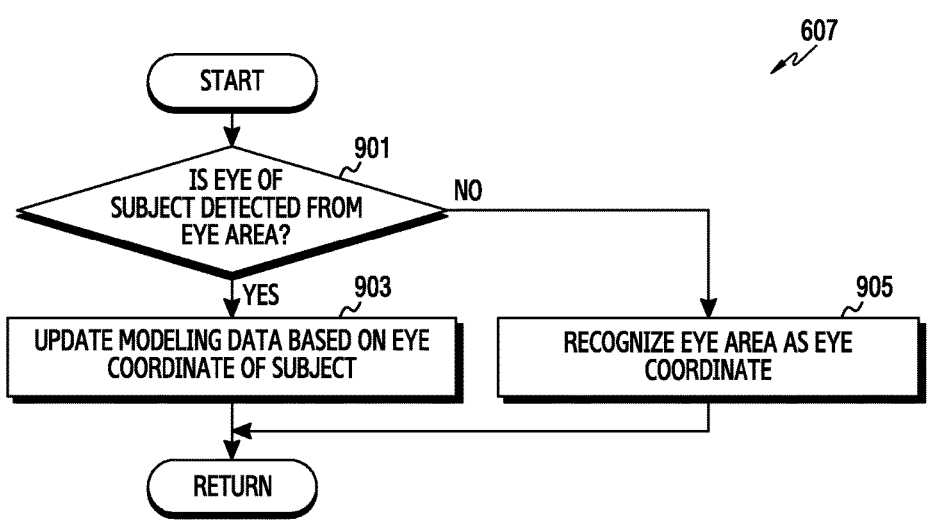
FIG. 9 is a flowchart that illustrates a method for detecting an eye of a subject through an eye area in an electronic device according to various embodiments of the present disclosure.
Figure 10:
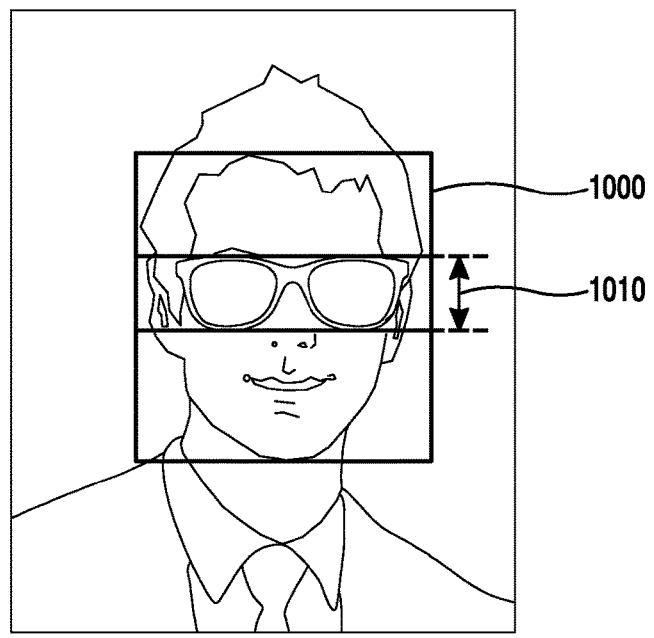
FIG. 10 illustrates a screen configuration for detecting an eye of a subject through an eye area according to various embodiments of the present disclosure.

FIG. 9 illustrates a flowchart for detecting an eye of a subject through an eye area in an electronic device according to various exemplary embodiments of the present disclosure. FIG. 10 illustrates a screen configuration for detecting an eye of a subject through an eye area according to various exemplary embodiments of the present disclosure. In the following description, an operation of detecting an eye of a subject in operation 607 of FIG. 6 is described with reference to the screen configuration of FIG. 10.

Referring to FIG. 9, in operation 901, the electronic device (e.g., the electronic device 101, 201, or 400) may confirm whether an eye of a subject is detected from an eye area of the subject included in a preview image. For example, the eye detector 410 may extract a feature point for at least one object included in the eye area of the subject. The eye detector 410 may compare the feature point for the at least one object and a pre-defined eye feature point to estimate an eye location (coordinate) of the subject included in the eye area.

In operation 903, if the eye of the subject is detected from the eye area of the subject included in the preview image, the electronic device may update at least one of modeling data and face's geometric ratio information on the basis of an eye coordinate of the subject. For example, if an eye location of the subject is estimated through an eye detection function from the eye detector 410, the processor 402 may update at least one of a location and size of the eye area included in the face's geometric ratio information so as to be matched to eye location information of the subject. For example, if the eye location of the subject is estimated through the eye detection function from the eye detector 410, the processor 402 may store the eye location information of the subject into the memory 416 by mapping the information to modeling data corresponding to face rotation information of the subject. For example, if a plurality of pieces of modeling data corresponding to the face rotation information of the subject are extracted, the processor 402 may extract modeling data corresponding to eye location information of the subject on the basis of eye area information which is set in each piece of modeling data. Accordingly, the processor 402 can detect accurate rotation information of a face of the subject.

If the eye of the subject is not detected from the eye area of the subject included in the preview image in operation 901, the electronic device may recognize the eye area as an eye coordinate of the subject included in the preview area to detect the eye of the subject. For example, as shown in FIG. 10, the eye detector 410 may configure at least one part of a face area 1000 of the subject included in the preview image as an eye area 1010. If the subject included in the eye area 1010 wears sunglasses as shown in FIG. 10, the eye detector 410 cannot detect the eye of the subject. Accordingly, the eye detector 410 may determine the eye area as the eye coordinate of the subject included in the preview area to detect the eye of the subject.

Figure 11:
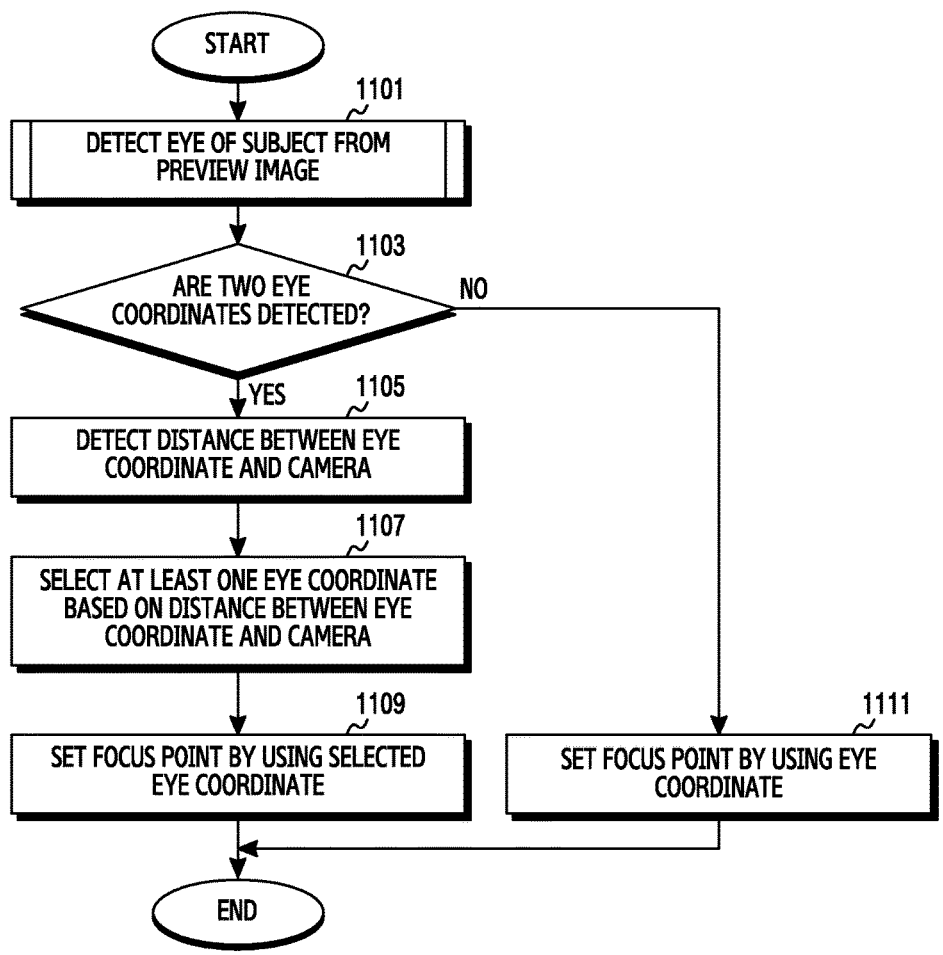
FIG. 11 illustrates a flowchart for setting a focus point by using an eye coordinate in an electronic device according to various embodiments of the present disclosure.
Figure 12A:
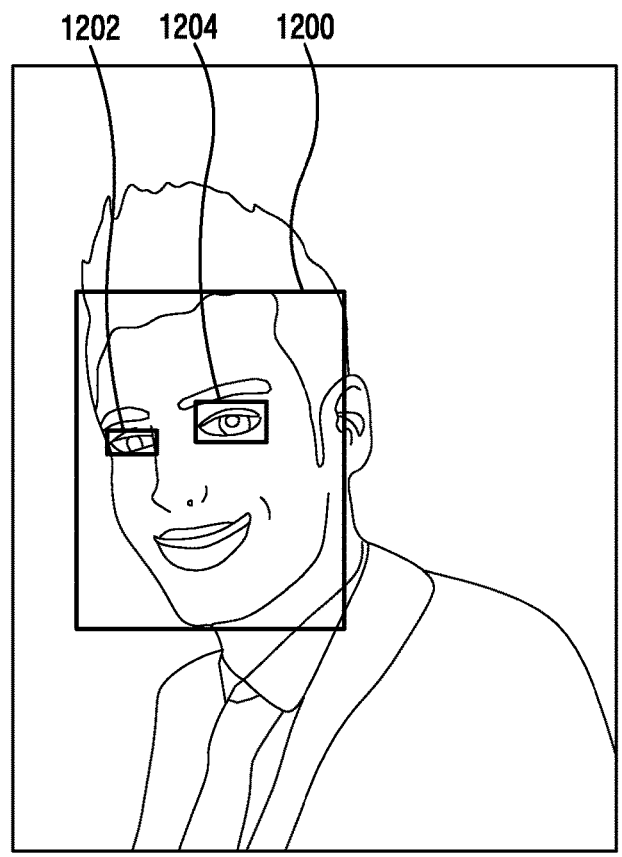
FIG. 12A to FIG. 12C illustrate a screen configuration for setting a focus point by using an eye coordinate according to various embodiments of the present disclosure.
Figure 12B:
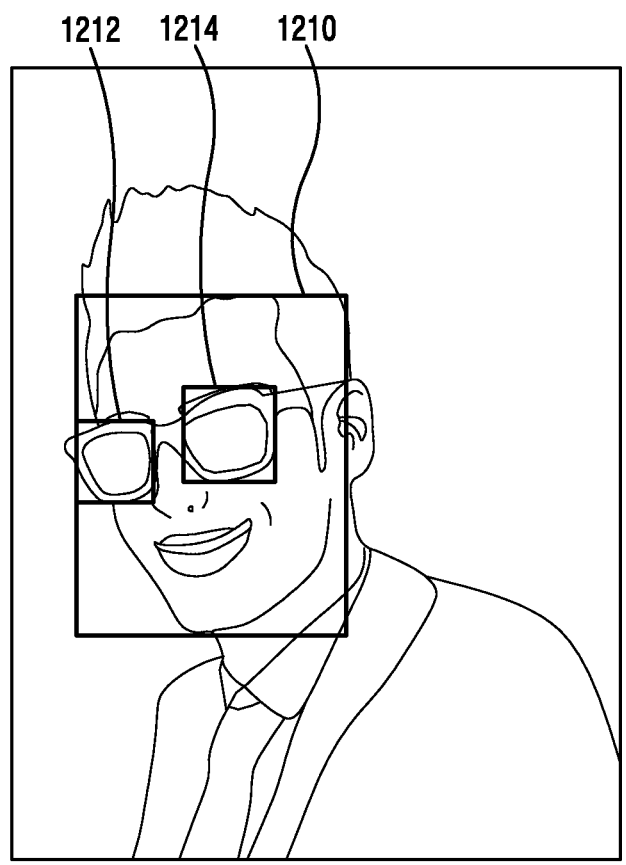
Figure 12C:
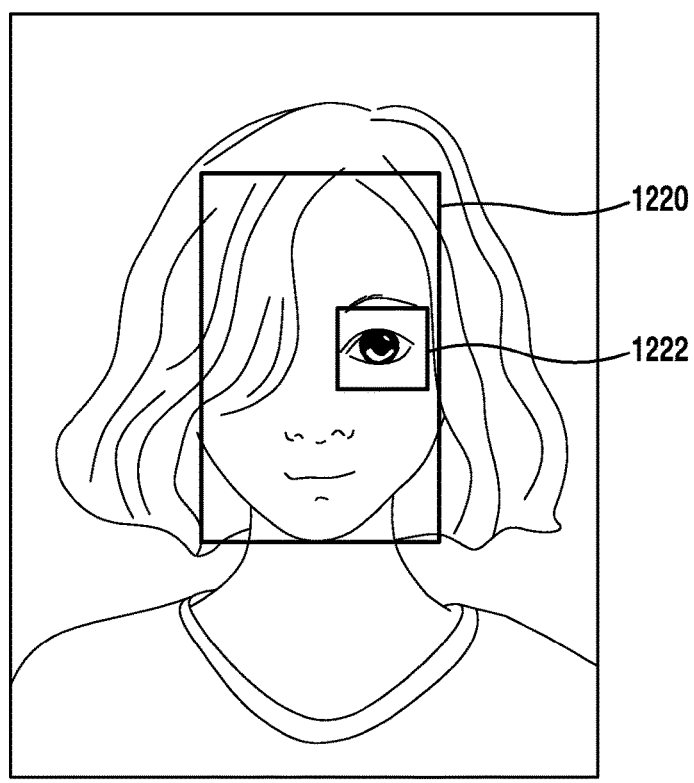

FIG. 11 illustrates a flowchart for setting a focus point by using an eye coordinate in an electronic device according to various exemplary embodiments of the present invention. FIG. 12A to FIG. 12C illustrate a screen configuration for setting a focus point by using an eye coordinate according to various exemplary embodiments of the present invention. In the following description, an operation of setting a focus point for auto capturing is described with reference to the screen configuration of FIG. 12A to FIG. 12C.

Referring to FIG. 11, in operation 1101, the electronic device (e.g., the electronic device 101, 201, or 400) may detect an eye of a subject from a preview image. For example, as shown in operations 601 to 607 of FIG. 6, the electronic device 400 may detect the subject's eye included in the preview image on the basis of modeling data corresponding to face rotation information of the subject. For example, if the subject's eye included in the preview image cannot be detected, the electronic device 400 may configure a subject's eye area, which is determined on the basis of the modeling data corresponding to the face rotation information of the subject and the face's geometric ratio information, as the subject's eye.

In operation 1103, the electronic device may confirm whether two eye coordinates are detected from the subject included in the preview image. For example, the processor 402 may confirm whether location information of a left eye of the subject and location information of a right eye are detected in operation 1101.

In operation 1105, upon detection of the two eye coordinates from the subject included in the preview image, the electronic device may detect a distance between the eye coordinate and a camera. For example, as shown in FIG. 12A, the eye detector 410 may detect a first eye coordinate 1202 and a second eye coordinate 1204 from a face area 1200 of a subject. The processor 402 may detect a distance between each of the first eye coordinate 1202 and the second eye coordinate 1204 and a camera module of the electronic device 400. For example, as shown in FIG. 12B, the eye detector 410 may configure a first eye area 1212 and a second eye area 1214 of a subject as an eye coordinate of the subject from a face area 1210 of the subject. The processor 402 may detect a distance between each of the first eye area 1212 and the second eye area 1214 and a camera module of the electronic device.

In operation 1107, the electronic device may select at least one eye coordinate for setting a focus point on the basis of the distance between each eye coordinate and the camera. For example, if the distance between the eye coordinates of the subject and the camera module of the electronic device 400 is identical, the processor 402 may select the eye coordinates of the subject as the eye coordinate for setting the focus point. For example, as shown in FIG. 12A, if the distance between the first eye coordinate 1202 and the second eye coordinate 1204 and the camera module of the electronic device 400 is different, the processor 402 may select the second eye coordinate 1204 close in distance to the camera module of the electronic device 400 as the eye coordinate for setting the focus point. For example, as shown in FIG. 12B, if the first eye area 1212 and second eye area 1214 of the subject are configured as the eye coordinate, the second eye area 1214 close in distance to the camera module of the electronic device 400 may be selected as the eye coordinate for setting the focus point.

In operation 1109, the electronic device may set the focus point for auto capturing on the basis of at least one eye coordinate selected in operation 1107 for setting the focus point.

In operation 1111, upon detection of one eye coordinate from the subject included in the preview image, the electronic device may set the focus point for auto capturing on the basis of the eye coordinate of the subject. For example, as shown in FIG. 12C, the eye detector 410 may detect a first eye coordinate 1222 from a face area 1220 of the subject. The processor 402 may set the focus point for auto capturing on the basis of the first eye coordinate 1222.

According to an embodiment of the disclosure, if it fails to set the focus point for auto capturing on the basis of the eye of the subject, the electronic device may set the focus point for auto capturing on the basis of the face area of the subject.

According to various embodiments of the present disclosure, if the electronic device fails in the eye detection of the subject and thus configures the eye area as the eye of the subject, an exposure may be incorrectly set due to an object (e.g., a hair, sunglasses) which covers the eye. Accordingly, the electronic device may set the exposure for auto capturing on the basis of the face area of the subject.

An electronic device and an operating method thereof according to various embodiments of the present disclosure detect eyes of a subject from an eye area configured to be associated with modeling data corresponding to face rotation information of a subject and geometric ratio information of a face, thereby improving accuracy for the eye detection of the subject and decreasing a computation amount for the eye detection.

An electronic device and an operating method thereof according to various embodiments of the present disclosure determine an eye area configured on the basis of modeling data corresponding to face rotation information of a subject and geometric ratio information of a face if an eye of the subject cannot be detected, thereby improving accuracy of an Auto-Focus (AF) function.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a program module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Although the present disclosure has been described with various exemplary embodiments, various changes and modifications may be suggested to one skilled in the art. It is intended that the present disclosure encompass such changes and modifications as fall within the scope of the appended claims.

What is claimed is:

1. An electronic device comprising:
   a camera;
   a memory; and
   a processor, wherein the processor is configured to:
      detect a face area corresponding to a face of a subject in a preview image acquired via the camera,
      detect rotation information on the face based on the face area,
      extract modeling data stored in the memory, based on the rotation information on the face,
      detect, based on the modeling data, at least one eye area in the face area,
      identify whether at least one eye of the subject is detected in the at least one eye area,
      in response to identifying that the at least one eye is detected in the at least one eye area, update, based on a first location of the at least one eye, the modeling data, and
      in response to identifying that the at least one eye is not detected in the at least one eye area, determine the at least one eye area as a second location of the at least one eye.

2. The electronic device of claim 1, wherein the processor is further configured to:
   detect a rotation direction of the face contained in the preview image using a multi-view face detection (MVFD) function.

3. The electronic device of claim 1, wherein the processor is further configured to:

extract at least one piece of modeling data corresponding to the rotation information on the face among a plurality of pieces of the modeling data.

4. The electronic device of claim 1, wherein the processor is further configured to:
   detect the at least one eye area in the face area from the preview image, based on the modeling data corresponding to the rotation information on the face and geometric ratio information of the face.

5. The electronic device of claim 1, wherein the at least one eye area is mapped to the modeling data.

6. The electronic device of claim 1, further comprising a display, and
   wherein the processor is further configured to:
   control the display to display the preview image.

7. The electronic device of claim 1, wherein the processor is further configured to:
   identify whether the at least one eye of the subject is detected in the at least one eye area by applying an eye detection function to the at least one eye area in the face area.

8. The electronic device of claim 1, wherein the processor is further configured to:
   set a focus point for auto capturing, based on the first location or the second location.

9. A method of operating an electronic device, the method comprising:
   acquiring a preview image via a camera module operatively coupled to the electronic device;
   detecting, based on modeling data, a face area corresponding to a face of a subject in the preview image;
   detecting rotation information on the face based on the face area;
   extracting, based on the rotation information on the face, the modeling data stored in the electronic device;
   detecting, based on the modeling data, at least one eye area in the face area;
   identifying whether at least one eye of the subject is detected in the at least one eye area;
   in response to identifying that the at least one eye is detected in the at least one eye area, updating, based on a first location of the at least one eye, the modeling data; and
   in response to identifying that the at least one eye is not detected in the at least one eye area, determining the at least one eye area as a second location of the at least one eye.

10. The method of claim 9, wherein the detecting of the rotation information comprises:
   detecting a rotation direction of the face contained in the preview image using a multi-view face detection (MVFD) function.

11. The method of claim 9, wherein the extracting of the modeling data comprises:
   extracting at least one piece of modeling data corresponding to the rotation information on the face among a plurality of pieces of the modeling data.

12. The method of claim 9, wherein the detecting of the at least one eye area in the face area comprises:
   detecting the at least one eye area in the face area from the preview image based on the modeling data corresponding to the rotation information on the face and geometric ratio information of the face.

13. The method of claim 9, wherein the at least one eye area is mapped to the modeling data.

14. The method of claim 9, further comprising:
   displaying the preview image acquired via the camera module by a display of the electronic device.

15. The method of claim 9, wherein identifying whether the at least one eye of the subject is detected in the at least one eye area comprises:
   identifying whether the at least one eye of the subject is detected in the at least one eye area applying an eye detection function to the at least one eye area in the face area.

16. The method of claim 9, further comprising:
   setting a focus point for auto capturing based on the first location or the second location.

17. A non-transitory computer-readable medium comprising program code that, when executed by at least one processor, causes an electronic device to:
   acquire a preview image via a camera module operatively coupled to the electronic device;
   detect a face area corresponding to a face of a subject in the preview image;
   detect rotation information on the face based on the face area;
   extract modeling data stored in the electronic device, based on the rotation information on the face;
   detect, based on the modeling data, at least one eye area in the face area;
   identify whether at least one eye of the subject is detected in the at least one eye area;
   in response to identifying that the at least one eye is detected in the at least one eye area; update, based on a first location of the at least one eye, the modeling data; and
   in response to identifying that the at least one eye is not detected in the at least one eye area, determine the at least one eye area as a second location of the at least one eye.

18. The non-transitory computer-readable medium of claim 17, wherein the program code that, when executed by the at least one processor, causes the electronic device to:
   detect a rotation direction of the face contained in the preview image using a multi-view face detection (MVFD) function.

* * * * *